United States Patent [19]

Schellekens et al.

[11] Patent Number: 4,913,870
[45] Date of Patent: Apr. 3, 1990

[54] PROCESS FOR PREPARING POLYACRYLONITRILE FILAMENTS HAVING HIGH TENSILE STRENGTH AND MODULUS

[75] Inventors: Ronald M. A. M. Schellekens, Smeermaas/Lanaken, Belgium; Pieter J. Lemstra, Brunssum, Netherlands

[73] Assignee: Stamicarbon B.V., Geleen, Netherlands

[21] Appl. No.: 71,213

[22] Filed: Jul. 8, 1987

Related U.S. Application Data

[63] Continuation of Ser. No. 887,616, Jul. 21, 1986, abandoned, which is a continuation of Ser. No. 679,407, Dec. 7, 1984, abandoned.

[30] Foreign Application Priority Data

Dec. 10, 1983 [NL] Netherlands .......................... 8304263

[51] Int. Cl.$^4$ ................................................. D01F 6/18
[52] U.S. Cl. ..................................... 264/182; 264/206; 264/210.6; 264/210.8; 264/203; 264/211; 264/211.16

[58] Field of Search ............... 264/184, 206, 211, 203, 264/210.2, 210.6, 210.8, 211.14, 211.16, 211.12, 182

[56] References Cited

U.S. PATENT DOCUMENTS 4,173,606 11/1979 Stoy et al. ............................ 264/206
4,352,852 10/1982 DeMaria ............................. 264/206

FOREIGN PATENT DOCUMENTS 0044534 1/1982 European Pat. Off. .
2018188 10/1979 United Kingdom .

*Primary Examiner*—Hubert C. Lorin
*Attorney, Agent, or Firm*—Cushman, Darby & Cushman

[57] ABSTRACT

Polyacrylonitrile articles, such as filaments, tapes and films, having high tensile strength and modulus, and prepared by adding to a solution of polyacrilonitrile with a molecular weight above $3 \times 10^5$, preferably above $5 \times 10^5$, a minor amount of a bivalent metal compound, converting the solution into a solvent containing article, cooling this article to form a gel article, removing from this gel the solvent and metal compound, and stretching the resulting article at increased temperature. With this process filaments with a tensile strength above 1.2 GPa and a modulus above 16 GPa can be obtained.

17 Claims, No Drawings

PROCESS FOR PREPARING POLYACRYLONITRILE FILAMENTS HAVING HIGH TENSILE STRENGTH AND MODULUS

This is a continuation of application Ser. No. 887,616 filed July 21, 1986, now abandoned, which in turn is a continuation of application Ser. No. 679,407 filed Dec. 7, 1984, now abandoned.

BACKGROUND OF THE INVENTION

The invention relates to a process for preparing articles with a high tensile strength and a high modulus starting from a polyacryonitrile solution.

Synthetic fibres based on polyacrylonitrile are well known and are used on a large scale in the textile industry. For this use the fibres are required to meet high standards in respect of, for instance paintability of the colour fastness, while the tensile strength and modulus of the fibres are less important. For this use, therefore, fibres having a tensile strength of 0.3–0.5 GPa and a modulus of 5–8 Gpa are generally applied, see 'International Conference on man-made Fibres for developing countries (1982), Sasmira Bombay pp 1–4' by B. von Falkai.

In addition there is a large and growing market for the so-called technical-fibres based on polyacrylonitrile, such as for cement reinforced with these fibres, the use in brake shoes and other materials of friction etc. For these uses the fibres must have a higher tensile strength and a higher modulus.

Another major field of application for technical polyacrylonitrile fibres is the preparation of carbon fibres and of the so-called POX (=partly oxidized) polyacrylonitrile fibres, where technical polyacrylonitrile fibres are subjected to thermal after-treatment, for instance to above 2000° C. in the preparation of carbon fibres and to about 250° C. in the preparation of the POX fibres. It has been found that for this use, too, improved mechanical properties of the polyacrylonitrile fibre, particularly high tensile strength and modulus, lead to carbon and POX-PAN fibres with better performance, see M. Santappa in 'Journal Indian Chem. Soc. 59 (1982) pp. 321–328'.

Though numerous methods have already been proposed for preparing technical polyacrylonitrile fibres having high strength and modulus, it has been found that by applying the known commercial processes only fibres can be prepared having tensile strengths to about 0.8 GPa and moduli to about 16 GPa, see, for instance, Technisch Informatie Bulletin no. 0198 of Mische, J and no. 0198b of Sassenrath, B., issued by Hoechst on 30.11.1982.

As known in the art, mainly two spinning methods are used in preparing polyacrylonitrile fibres, viz. the so-called wet spinning and dry spinning. Another spinning method known in the art, the so-called melt spinning used for various polymers, is hardly feasible in the spinning of polyacrylonitrile, because at elevated temperature the polymer is unstable in consequence of intramolecular cyclization. In the dry as well as wet spinning processes the polyacrylonitrile is dissolved in a suitable medium, the solution is pressed through openings while filaments are being formed, upon which these filaments are dried in heated gas (dry spinning) or passed into a coagulating bath (wet spinning). In this operation the solvent is removed from the filament, upon which the product is ready for further treatment, such as cutting, twisting, afterstretching. It is known that the spinning conditions influence the mechanical properties of the fibres finally obtained after the stretching. Numerous proposals have therefore been made to improve the mechanical properties of the finally resulting fibres by applying specific conditions, for instance special coagulation methods, special additives to and concentrations of the solution to be spun. Generally, however, these proposals have resulted in only marginal improvements of, among other things, tensile strength and modulus.

As known in the art, the spun filaments obtained after removal of the solvent only have a low strength and modulus, and these filaments must be subjected, for technical applications, to afterstretching. For this afterstretching process, too, numerous proposals have already been made, such as the addition of plasticizers, afterstretching in a plurality of steps under specific conditions or not, in order thus to obtain filaments with high tensile strength and modulus. These proposals, too, have generally resulted in only marginal improvements. See for instance: A. I. Stoyanov, Journal of Appl. Pol. Science, 27, page 235. W. Sarmadjieva et al., JSDC, 97 (1981) page 465. A. I. Stoyanov, Journal of Appl. Pol. Science, 24, page 583. S. Minami, Appl. Polymer Symposium, 25 (1974) page 145. R. B. Beevers, Journal of Appl. Pol. Science 9 (1965) page 1499.

It has already been proposed (see GB-A-2.018.188) to prepare polyacrylonitrile fibres having a relatively high tensile strength (about 1 GPa) and modulus (about 12 GPa) by carrying out the spinning as well as the stretching under highly specific conditions. According to this known process a polyacrylonitrile is dissolved in an aqueous thiocyanate solution, the solution is spun in an aqueous coagulating medium to form filaments, which are then subjected to a first stretching process, subsequently washed, subjected to a second stretching process in water at elevated temperature, and then subjected at high temperature in a zone under steam pressure to a third stretching process. A disadvantage of this process is that it is very laborious, while the strength and modulus of the resulting fibres are indeed higher than in the processes applied for commercial purposes, but yet insufficient for a number of technical uses.

It is further known to prepare fibres having a very high tensile strength and modulus starting from solutions of polyethylene with a high molecular weight, see U.S. Pat. Nos. 4,344,908; 4,422,993 and 4,430,383. According to the process described in U.S. Pat. No. 4,344,908, to this end a relatively dilute solution of the polyethylene is spun, the resulting filament cooled to form a gel filament, and the solvent-containing gel filament stretched at increased temperature. According to the process described in U.S. Pat. Nos. 4,422,993 and 4,430,383, to this end a solution of high-molecular polyethylene is spun, the solvent largely or partly removed if so desired, and the gel filament subjected at a specific temperature to a high degree of stretching related to the molecular weight. In applying these known processes it has been found that as the molecular weight of the polyethylene increases, the moduli that can be reached, but particularly the tensile strengths that can be reached, will be higher. By applying this known process polyethylene-based fibres can therefore be prepared having tensile strengths far beyond 1.2 GPa and moduli of more than 20 GPa.

In the said U.S. Pat. No. 4,344,908 it is stated that the process can be generally applied to materials that can be processed by solution spinning to form filaments, for instance also polyacrylonitrile. It has now been found, however, that although in applying this process for the spinning and stretching of high molecular polyacrylonitrile a fibre with a substantially higher modulus is obtained, viz. about 15 GPa, the tensile strength attainable, however, increases only slightly, for instance to 0.7-0.8 GPa. Prima facie this known process consequently does not seem economically attractive for polyacrylonitrile, considering the extra effort that must be put forth in respect of the polymerization of high molecular polyacrylonitrile, the lower concentration of the solution to be spun and the lower process efficiency related thereto, and the problems inherent in the handling of high molecular solutions to be spun.

DESCRIPTION OF THE INVENTION

The present invention now provides a process in which, starting from a solution of high molecular polyacrylonitrile, articles such as fibres, tapes, films having a high tensile strength and a high modulus can be obtained in a technolgically and economically acceptable manner and period of time.

The invention therefore relates to a process for preparing articles having a high tensile strength and a high modulus by converting a solution of polyacrylonitrile into a solvent containing article, cooling the articles formed and stretching them at increased temperature, this process being characterized in that a. to a 0.5-15% (wt) solution of polyacrylonitrile or a copolymer of acrylonitrile with at most 15% (wt) co-monomer with a weight average molecular weight of $0.3 \times 10^6$ to $10 \times 10^6$ in a solvent suitable for that purpose a bivalent metal compound is added in a quantity of 0.01-0.2 mole per mole acrylonitrile units;

b. the solution thus obtained is converted at increased temperature into a solvent containing article;

c. this article is cooled to below the gelation temperature;

d. the gel article thus formed is largely freed of solvent and metal compound;

e. the article thus obtained is stretched at a temperature above the glass transition point of polyacrylonitrile and below the decomposition temperature of polyacrylonitrile.

Consequently, the essence of the present invention is the effectuation of a thermoreversible gelation process, i.e. that by means of metal compounds and temperature reduction and on the basis of high molecular polyacrylonitrile first a homogeneous gel structure is introduced and this gel is subsequently transformed without liquid-liquid phase separation into mechanically manageable articles without loss of stretchability, upon which these articles can be stretched efficiently and to high degrees of stretching, resulting in polyacrylonitrile articles with a high tensile strength and a high modulus.

The present process differs from the conventional wet spinning processes for poly(acrylonitrile) fibres in that in the conventional process the spun filaments are coagulated in a certain medium. In this coagulation process the polymer precipitates (see for instance D. R. Paul, Journal of Applied Polymer Science 12, 383, 1968). As a result of this precipitation process, the concentration of the polymer shows a strong increase, in consequence of which the original low entanglement density of the polymer molecule in the solution is eliminated again, which has an unfavourable effect on the stretchability. Moreover, the result of this precipitation process is that a liquid-liquid phase separation occurs so that the coagulated filament is inhomogeneous by character (see for instance P. Lagerkvist and P. Flodin, Journal of Polymer Science, Polymer Letters Edition, 19, 125 (1981)).

In a homogeneous thermoreversible gelation process according to the invention the objective is for the network to be built up by intermolecular polymer contacts in which the conformation and distribution in mass of the network formed show little difference with the macromolecules in solution.

The invention proceeds from a high-molecular polyacrylonitrile with a weight-average molecular weight of at least $3 \times 10^5$. Such a polyacrylonitrile can be obtained in a manner known per se via for instance, radical polymerization in emulsion or in solution. When the term polyacrylonitrile is used here and elsewhere in the present application, it is understood to mean both a homopolymer of acrylonitrile and a copolymer of acrylonitrile with minor amounts, for instance up to 15% (wt), of monomers compatible therewith, such as methacrylates, acrylates, vinylacetate. As it has been found that the moduli and tensile strengths attainable are higher as the molecular weight increases, preference is given to using a polyacrylonitrile with a molecular weight of at least $5 \times 10^5$.

As its molecular weight increases, the polyacrylonitrile is more difficult to process. The dissolution in a suitable solvent will be more time-consuming and with the same concentration the solutions will be more viscous, so that lower concentrations have to be taken, which is at the expense of process efficiency. Therefore, polyacrylonitrile with molecular weights beyond $10 \times 10^6$, in particular beyond $5 \times 10^6$ will generally not be used, even though with higher molecular weights the present process is feasible. The weight-average molecular weights can be determined according to known methods by gel permeation chromatography and light scattering.

The solvent used for the polyacrylonitrile may in principle be any solvent in which polyacrylonitrile can be dissolved. However, as the conversion of the solution generally takes place at increased temperature, low-boiling solvents are less desirable, because they can evaporate from the articles so quickly that they will come to to function more or less as foaming agents and will disturb the structure of the articles. Suitable solvents are generally substances capable of eliminating intermolecular dipole-dipole interactions. Examples are dimethylformamide, dimethylacetamide, dimethylsulphoxide and ethylenecarbonate. Dimethylformamide has been found to be particularly suitable.

The polyacrylonitrile concentration in the solution may vary within wide limits, depending in part on the nature of the solvent and the molecular weight of the polyacrylonitrile. Solutions having a concentration of more than 15% (wt) are rather difficult to cope with—particularly when using polyacrylonitrile with a very high molecular weight, for instance higher than $2 \times 10^6$—because of the high viscosity that occurs. On the other hand, the use of solutions with a polyacrylonitrile concentration lower than, for instance 0.5% (wt) has the disadvantage of a loss in yield and an increase in the costs of separating off and recovering solvent. Generally, a polyacrylonitrile solution with a concentration between 1 and 10% (wt), specifically 3-7% (wt), will therefore be started from.

An essential feature of the present process is the addition of compounds of bivalent metals to the solution to be spun. Preference is given to the use of compounds of calcium and particularly of zinc. Preferably a salt soluble in the solution is used, such as chloride or bromide. The amount of metal compound to be added must be between 0.01 and 0.2 mole per mole acrylonitrile units. If a smaller amount is used, it is found that the benefit to be gained in terms of mechanical properties is negligible. On the other hand, the disadvantage of using a larger quantity is that the viscosity of the solution increases strongly. Preference is given to adding 0.02-0.1 mole bivalent metal compound per mole acrylonitrile units.

Spinning of polyacrylonitrile from salt solutions, particularly salts from zinc, is known per se, see for instance U.S. Pat. No. 3,265,656, U.S. Pat. No. 3,368,015, JP-A-74,00415, DE 3,034,044. In these processes the polyacrylonitrile, which usually has a relatively low molecular weight, is dissolved in a highly concentrated salt solution as part of a very specific spinning method. Though fibres having improved properties can be obtained in that process, the modulus and tensile strength of the fibres are insufficient for various technical applications.

It is also known, see NL-A-7,416,551, to dissolve acrylonitrile together with a comonomer in a highly concentrated salt solution of zinc chloride and sodium chloride, subsequently to polymerize it in the presence of formaldehyde and hydrogen peroxide under the influence of ultraviolet rays to form a polymer having an average molecular weight of about 200,000 and to spin the resulting polyacrylonitrile-containing salt solution in a coagulation batch, and to stretch same, in which process an oriented structure is formed of the skin of the fibre in the coagulation process by stretching. Although in this known process fibres can be obtained having relatively high tensile strengths, the process applied is highly laborious and economic production according to that process is not possible.

The conversion of the solution into a solvent containing article, such as filament, tape or film, can be effected in various ways, for instance by spinning, dividing on e.g. a cylindre or roll, extruding, calendring or rolling.

The metal-containing polyacrylonitrile solution obtained in the present invention is preferably spun through a spinning hole in a manner known per se. To this end spinning heads with round holes, for instance with diameters between 0.02 and 2.0 mm, as well as slit dies with die widths up to several centimetres, can be used.

The conversion of the solution is effected at increased temperature, particularly above 90° C., while the boiling point of the solvent in particular at least equals the conversion temperature. Of course the conversion temperature and the dissolving temperature must not be so high as to result in substantial thermal decomposition of the polyacrylonitrile. These temperatures will therefore generally not be chosen beyond 150° C. The articles are subsequently cooled to below the gelation temperature. This cooling can in principle be effected by passing through a cold gas flow. The cooling is preferably effected in a liquid medium of, for instance, ambient temperature in which the polyacrylonitrile does not dissolve or hardly so. Examples of suitable media include toluene, dichloromethane, water and/or mixtures of these. Preference is given to the use of dichloromethane.

During this cooling (quenching) process the spun article is converted into a homogeneous, virtually transparent gel article containing substantial amounts of solvent, possible liquid medium and metal compounds. This gel article is subsequently largely freed of solvent, metal compound and liquid medium, if any. This can be effected, for instance, by evaporating the solvent, in which process, however, it is difficult to adequately remove the metal compound. Preferably the gel article is put in a liquid extracting medium, the temperature being kept below the dissolution temperature of the gel.

The extracting medium used may include dichloromethane, water or mixtures of water and dimethylformamide.

The articles thus treated are subsequently stretched in one or more steps. The temperature is then generally to be kept above the glass transition temperature of the polyacrylonitrile. On the other hand, the stretching must be done below the decomposition temperature of the polyacrylonitrile. The chosen temperature is preferably between about 140° C. and 180° C.

It has been found that in the present process high stretch ratios can be applied. As the modulus and tensile strength increase as the stretch ratio increases, generally stretch ratios of at least 10 and preferably of at least 20 are used. Preferably an uniaxial stretching is applied. However, particularly in the preparation of films, also biaxial stratching can be applied.

The articles, tapes and films according to the invention have excellent mechanical properties. Thus articles, particularly filaments having moduli of 15 to 25 GPa and even higher and tensile strengths of 1.2 to 2.0 GPa and beyond can be prepared per se. The articles, therefore, are highly suitable for almost all technical uses, such as fibre-reinforcing material in cement, polyesters, epoxy resins, as precursors for carbon fibres, rope, nets, filter cloths, as precursors for magnetic tapes, tapes for medicinal uses. Films for packing material, isolating films.

If so desired, minor amounts, particularly amounts of 0.1-10% (wt) calculated on the polyacrylonitrile, of the usual additives, stabilizers, fibre-treating agents and the like can be incorporated in or on the articles according to the invention.

The invention is further elucidated in the following examples without, however, being limited thereto.

COMPARATIVE EXAMPLE A

To a mixing vessel provided with dimethylformamide a high-molecular polyacrylonitrile having a weight-average molecular weight of about $1.3 \times 10^6$ and having a comonomer incorporation percentage of 4% methylacrylate was added at 110° C. The polyacrylonitrile had been prepared via emulsion polymerization and its intrinsic viscosity measured in dimethylformamide at 23° C. was 6.8. The resulting suspension was stirred till a homogeneous solution with a 5% (wt) concentration was obtained.

The mixture was subsequently spun via spinning capillaries with a diameter of 0.3 mm at a temperature of about 110° C.

The resulting filaments were passed through a bath of dichloromethane at room temperature, in which process they became opaque. The opaque filaments were subsequently passed to a bath of water, at which the remaining dimethylformamide and dichloromethane were largely extracted. The resulting filaments were dried and subsequently stretched on a hot sheet at 160° C.

The filaments resulting in this process were cooled down to room temperature, upon which the mechanical properties of the product filaments were determined.

The results are summarized in Table I.

EXAMPLE I

The process of example A was repeated on the understanding that first zinc chloride was dissolved in the dimethylformamide in such a quantity that the molar ratio between $Zn^{2+}$-ions and acrylonitrile units in the ultimately resulting solution to be spun was 1:50.

In the quenching of the spun filaments in dichloromethane homogeneous and virtually transparent gel filaments were obtained, which were further treated in the same way as in example A.

The fibre properties of the product filaments are also summarized in Table I.

EXAMPLES II-IV

The process of example I was repeated, using varying amounts of zinc chloride, however.

The results are summarized in Table I.

EXAMPLE V

The process of example I was repeated on the understanding that a polyacrylonitrile having a weight-average molecular weight of about $1.5 \times 10^6$ and a comonomer incorporation percentage of 1% methylacrylate was used.

The results are summarized in Table I.

EXAMPLE VI

The process of example I was repeated on the understanding that in the dimethylformamide calcium chloride instead of zinc chloride was dissolved in such a quantity that the molar ratio of $Ca^{2+}$:acrylonitrile units in the ultimately resulting solution to be spun was 1:15.

The results are summarized in Table I.

COMPARATIVE EXAMPLE B

The process of example VI was repeated on the understanding that instead of calcium chloride aluminium trichloride was dissolved in the dimethylformamide.

The results are summarized in Table I.

EXAMPLES VII-XI

The process of example I was repeated, using varying stretching temperatures, however.

The results are summarized in Table I.

COMPARATIVE EXAMPLE C

The process of comparative example A was repeated, on the understanding that a polyacrylonitrile having a weight-average molecular weight of about $5.5 \times 10^5$ and a comonomer incorporation percentage of 4% methylacrylate was dissolved in such a quantity that an 11% (wt) solution was obtained.

The results are summarized in Table I.

COMPARATIVE EXAMPLE D

The process of comparative example A was repeated on the understanding that a polyacrylonitrile having a weight-average molecular weight of about $9 \times 10^4$ and a comonomer incorporation percentage of 4% methylacrylate was dissolved in such an amount that a 20% (wt) solution was obtained. The diameter of the spinning capillaries was 0.15 mm.

The results are summarized in Table I.

EXAMPLE XII

The process of comparative example C was repeated on the understanding that first such an amount of zinc chloride was dissolved in the dimethylformamide that the molar ratio of $Zn^{2+}$-ions:acrylonitrile units in the ultimately resulting solution to be spun was 1:50.

The results are summarized in Table I.

COMPARATIVE EXAMPLE E

The process of comparative example D was repeated on the understanding that first such an amount of zinc chloride was dissolved in the dimethylformamide that the molar ratio of $Zn^{2+}$-ions:acrylonitrile units in the ultimately resulting solution to be spun was 1:50.

The results are summarized in Table I.

TABLE I

| Ex. | Molar Ratio Metal Additive to —$CH_2CHCN$— Units | Stretch[1] Temperature (°C.) | Stretch Ratio = $L/L_O$ | Tensile[2] Strength at Break (GPa) | Modulus[3] (GPa) | Elongation at Break (%) | Filament Titre (dtex) |
|---|---|---|---|---|---|---|---|
| A | 0:0 | 160 | 11 | 0.7 | 12 | 7 | 8 |
| I | 1:50 | 160 | 23 | 1.5 | 17 | 9 | 3 |
| II | 1:100 | 160 | 22 | 1.3 | 15 | 8 | 4 |
| III | 1:25 | 160 | 19 | 1.4 | 15 | 8 | 4 |
| IV | 1:10 | 160 | 17 | 1.2 | 13 | 8 | 5 |
| V | 1:50 | 160 | 18 | 1.5 | 18 | 9 | 3 |
| VI | 1:15 | 160 | 19 | 1.3 | 17 | 9 | 3 |
| B | 1:15 | 160 | 12 | 0.8 | 11 | 8 | 7 |
| VII | 1:50 | 140 | 13 | 0.8 | 12 | 8 | 8 |
| VIII | 1:50 | 160 | 23 | 1.5 | 17 | 9 | 3 |
| IX | 1:50 | 170 | 25 | 1.7 | 21 | 10 | 2 |
| X | 1:50 | 180 | 28 | 1.8 | 22 | 10 | 2 |
| XI | 1:50 | 190 | 28 | 1.5 | 18 | 9 | 2 |
| C | 0:0 | 160 | 9 | 0.6 | 9 | 6 | 12 |
| D | 0:0 | 160 | 7 | 0.4 | 8 | 6 | 10 |
| XII | 1:50 | 160 | 12 | 0.9 | 12 | 7 | 8 |

TABLE I-continued

| Ex. | Molar Ratio Metal Additive to —CH$_2$CHCN— Units | Stretch[1] Temperature (°C.) | Stretch Ratio = L/L$_O$ | Tensile[2] Strength at Break (GPa) | Modulus[3] (GPa) | Elongation at Break (%) | Filament Titre (dtex) |
|---|---|---|---|---|---|---|---|
| E | 1:50 | 160 | 7 | 0.4 | 10 | 7 | 10 |

[1] The degree of stretching is defined as relative elongation L/LO measured via marking of fiber.
[2] The tensile strength at break and the elongation at break are measured on a Zwick 1445 tensile strength tester. Distance between grips 50 mm, drawing speed 5 mm/min.
[3] The modulus is determined from the slope of the first part (between 0 and 1% stretch) of the so-called tension-strength diagram and at 23° C. All measuring values are averages from at least 5 experiments.

The above results show:

A. (Comparative example A versus C and D) that an increase in the molecular weight of the polyacrylonitrile indeed in strength and modulus, but that the final strength is then (without metal additive) yet relatively low.

B (Comparative example D versus E) that when using low-molecular polyacrylonitrile no fibers with a high strength and modulus are obtained even if metal additive is used.

C (Comparative example B) that the addition of trivalent metal ions has a much smaller effect as far as tensile strength and modulus are concerned than addition of bivalent metal ions. (Examples I–XI).

D (Examples I–XII versus comparative examples A, B, C and D) that the addition of bivalent metal ions causes a drastic increase in the tensile strength and modulus of the product fibers.

We claim:

1. A process for the preparation of polyacrylonitrile articles having the combined properties of high tensile strength and high modulus which consists essentially in the combination of steps of:
   (a) preparing a solution of 0.5–15 wt. % of polyacrylonitrile or copolyacrylonitrile in a solvent for polyacrylonitrile having at most 15 wt. % of comonomer therein and of a weight-average molecular weight of from $0.3 \times 10^6$ to $10 \times 10^6$, said solution also containing a bivalent metal compound present in an amount of from 0.01 to 0.2 moles per mole of acrylonitrile units;
   (b) forming, at an increased temperature, a solvent-containing article from said solution;
   (c) cooling said article to a temperature below the gelation temperature to form a gel article;
   (d) substantially removing from said gel article the solvent and metal compound contents thereof; and
   (e) stretching the article thus obtained at a temperature between 140° C. and 180° C., and at a stretch ratio of at least 10.

2. The process of claim 1 wherein said solution contains 1–10 wt. % of polyacrylonitrile having a weight-average molecular weight of $0.5 \times 10^6$ to $5 \times 10^6$.

3. The process of claim 1 wherein said bivalent metal compound is a soluble salt of calcium or zinc.

4. The process according to claim 1 wherein the solvent-containing article is cooled in a liquid medium in which the polyacrylonitrile is substantially insoluble.

5. The process of claim 4 wherein said liquid medium is toluene, dichloromethane, water or mixtures thereof.

6. The process of claim 1 including the step of treating the gel article obtained by cooling in an evaporation zone.

7. The process according to claim 1 wherein in step (d) the gel article is subjected to extraction in a liquid medium at a temperature below the dissolution temperature of the gel.

8. The process of claim 7 wherein said liquid medium is dichloromethane, water or a mixture of water and dimethylformamide.

9. The process according to claim 1 wherein said stretch ratio is at least 20.

10. The process according to claim 1 wherein said wt. % concentration of polyacrylonitrile is from 3 to 7.

11. A process for the preparation of films, filaments or tapes of polyacrylonitrile having the combined properties of a tensile strength of at least 1.2 GPa and a modulus of at least 15 GPa which consists essentially in the combination of steps:
   (a) preparing a solution of 0.5–15 wt. % of polyacrylonitrile or copolyacrylonitrile having at most 15 weight percent of comonomer therein and a weight-average molecular weight of from $0.3 \times 10^6$ to $10 \times 10^6$, said solution also including a bivalent metal compound present in an amount of from 0.01 to 0.2 moles per mole of acrylonitrile units;
   (b) spinning or extruding said solution at a temperature between about 90° C. and 150° C. to form a solution-containing film, filament or tape;
   (c) cooling said film, filament or tape to a temperature below the gelation temperature to form a gel film, filament or tape;
   (d) substantially removing from said gel film, filament or tape the solvent and metal compound contents thereof; and
   (e) stretching the film, filament or tape thus obtained at a temperature between 160° C. and 180° C., and at a stretch ratio of at least 10.

12. The process of claim 11 wherein said stretch ratio is at least 20.

13. The process of claim 11 wherein said solution is spun at a temperature of between 90° and 150° C. through a spinning hole to form said fiber, filament or tape.

14. A process for the preparation of a polyacrylonitrile filament product having the combined properties of a tensile strength of at least 1.2 to 2.0 GPa and a modulus of at least 15 to 25 GPa which consists essentially in the combination of process steps of:
   (a) preparing a solution consisting essentially of 0.5 to 15 wt. % of a polyacrylonitrile or copolyacrylonitrile having at most 15 wt. % of comonomer therein and of a weight-average molecular weight of from $0.3 \times 10^6$ to $10 \times 10^6$, in a solvent selected from the group consisting of dimethylformamide, dimethylacetamide, dimethylsulphoxide, and ethylenecarbonate, said solution also containing a bivalent metal compound present in an amount of from 0.01 to 0.2 moles per mole of acrylonitrile units;
   (b) spinning or extruding said solution through a die at a temperature from about 90° C. to about 150° C. and above the gelation temperature to form a solvent-containing filament;

(c) cooling said solvent-containing filament to a temperature below the gelation temperature to form a gel filament;
(d) cooling said filament in a liquid medium and substantially removing therefrom the solvent and metal compound content thereof; and
(e) thereafter stretching the filament at a stretch ratio of at least 10 at a temperature from 140° C. to 180° C. to form said polyacrylonitrile filament product.

15. The process of claim 14 wherein said stretch ratio is at least 20.

16. The process of claim 15 wherein said stretching temperature is from about 160° to about 180° C.

17. The process of claim 14 wherein said solvent is dimethylformamide.

* * * * *

UNITED STATES PATENT AND TRADEMARK OFFICE
CERTIFICATE OF CORRECTION

PATENT NO. : 4,913,870

DATED : April 3, 1990

INVENTOR(S) : Schellekens et al

It is certified that error appears in the above-identified patent and that said Letters Patent is hereby corrected as shown below:

```
Column 9, line 2 of Note A in Table I,
     "indeed in strength" should read
     --indeed brings about an increase in
strength--.
```

Signed and Sealed this

Tenth Day of September, 1991

Attest:

HARRY F. MANBECK, JR.

Attesting Officer

Commissioner of Patents and Trademarks